March 7, 1961 W. SCHOBBE 2,974,266
MOTOR CONTROL FOR KNITTING MACHINES
Filed March 27, 1957 2 Sheets-Sheet 1

Inventor:
WILHELM SCHOBBE
By Toulmin & Toulmin
Attorneys

United States Patent Office 2,974,266
Patented Mar. 7, 1961

2,974,266

MOTOR CONTROL FOR KNITTING MACHINES

Wilhelm Schobbe, Frankfurt am Main, Germany, assignor to Licentia Patent-Verwaltungs-G.m.b.H., Hamburg, Germany Filed Mar. 27, 1957, Ser. No. 648,816

Claims priority, application Germany Mar. 27, 1956

1 Claim. (Cl. 318—158)

This invention relates to a control arrangement for knitting machines, and more particularly to Ward-Leonard drive systems for straight-bar, or cotton, knitting machines.

It is an object of the invention to provide a simple and sturdy control arrangement in combination with the Ward-Leonard drive system of a knitting machine, which arrangement does not require electronic or magnetic amplifying means or the like, nor the use of an exciting machine.

Knitting machines of all kinds, and in particular cotton machines, i.e. straight-bar knitting machines, require a highly efficient drive system comprising motors which are specially adapted to the particular characteristics of these machines. For instance, if stockings are to be knit to obtain the finished article on one and the same machine, the knittting work comprises the knitting of patterns, the strengthening of certain portions of the stockings, the "narrowing" of the article, etc., all of which different types of work must be carried out at specific speeds of the machine, which speeds are most favorable for the particular type of operation. The motor driving the machine must be adapted to operate equally well at these various speeds.

It is known in the art to use Ward-Leonard drives for cotton machines, in which the shunt circuit field of the Leonard generator is controlled via an electronic amplifier. Leonard drives are described, for instance, in "Die Elektrotechnik und die elektrischen Antriebe" by W. Lehmann, 1953, p. 106, and switch arrangements on pict. 558 thereof; a Ward-Leonard drive provided with an electronic amplifier is described in "The Reading Full-Fashioned Knitting Machine" by Reliance Electric Engineering Co., dated October 1, 1949.

The known arrangements suffer generally from the drawback that the electronic valve means required for their operation are not sufficiently sturdy and, due to their sensitiveness, require specialized attendance.

This drawback is avoided by the arrangement according to the invention, which comprises a Ward-Leonard generator and motor drive system with means for controlling the shunt circuit exciting field of the Leonard generator, and voltage stabilizer means and rectifying means for feeding power to this field from an alternating electric current supply line.

The voltage stabilizing means provided in the control arrangement according to the invention prevent fluctuations of the voltage in the main power line to affect the shunt circuit field exciting means of the Ward-Leonard generator, so that the pre-set working speeds of the motor are maintained constant.

According to a further preferred feature of the invention, the voltage stabilizer is laid out in such a manner that it compensates the voltage fluctuations of the main power line only up to a determined fraction, which uncompensated fraction corresponds to the changes in the speed of the motor which are due to the changes caused by the shunt circuit field of the motor as a consequence of the aforesaid fluctuations.

The control arrangement according to the invention permits to effect the control of the shunt circuit exciting field of the Leonard generator on the alternating current side of the rectifier means serving as a source of direct current voltage for the exciting field. This offers the advantage that the speed selecting switches provided with the control arrangement make and break circuits of alternating current and not of direct current. It is well known that the wear of the contacts in direct current switches is much greater than in alternating current switches.

The rectifiers used in the control arrangement according to the invention may, for instance be conventional selenium dry-plate rectifiers.

Additional objects and advantages will become apparent from the following detailed description of the accompanying drawings, in which Figure 1 is a wiring diagram, by way of example, of the control arrangement according to the invention comprising the Ward-Leonard drive of a straight-bar knitting machine (cotton machine);

Figure 1:
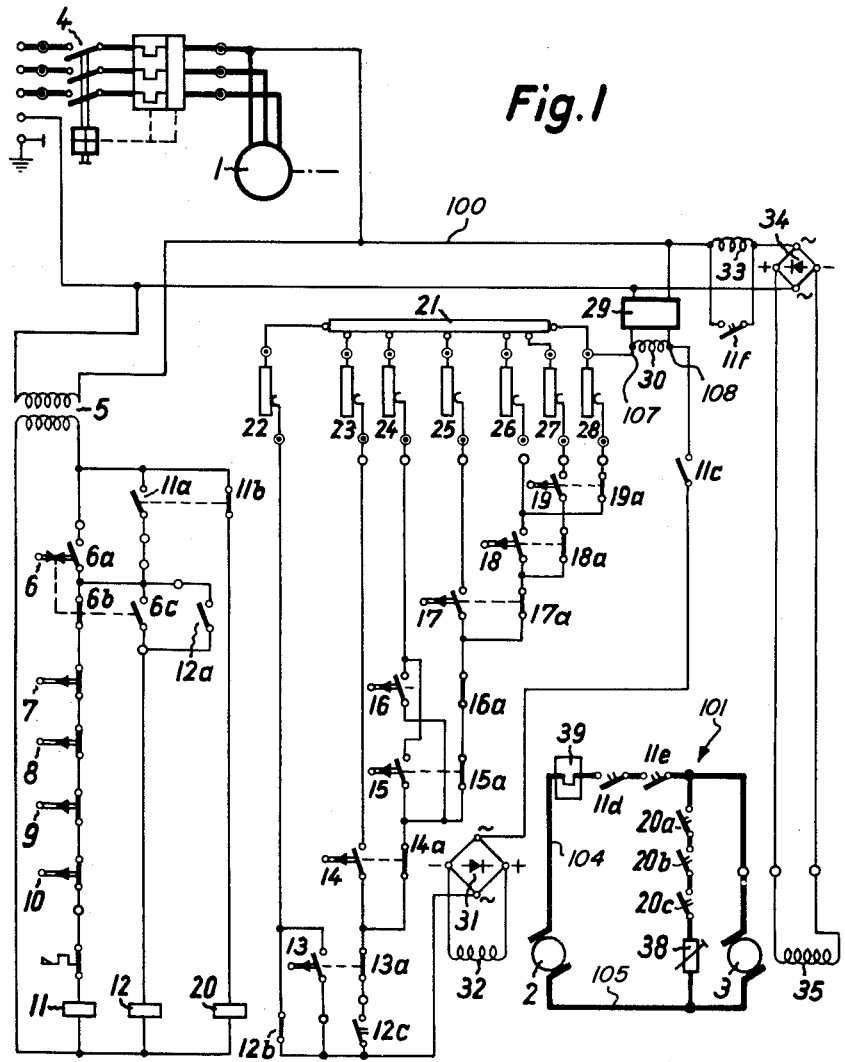

Referring now to the drawings more in detail, and in particular to Figure 1, reference numeral 1 designates the three-phase alternating current motor 1, which is supplied with power from an A.C. three-phase power line by closing main power switch 4.

Figure 4:
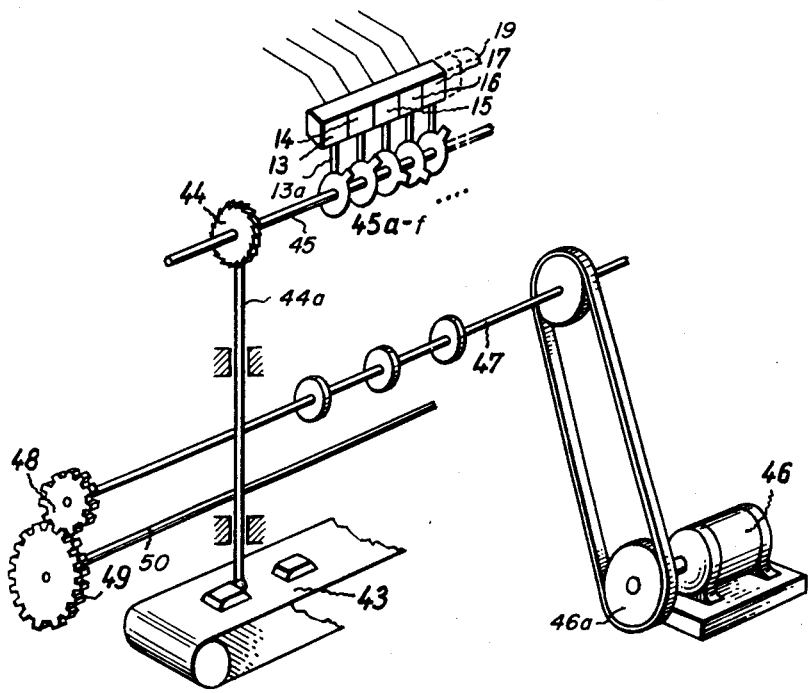
Figure 4 illustrates in a perspective view the arrangement of switches forming part of the control arrangement according to the invention illustrated in Figure 1.

Three-phase motor 1 is mechanically connected for driving generator 2 of the Ward-Leonard drive of, for instance, the cotton machine, schematically represented in in Figure 4. This Ward-Leonard drive further comprises a motor 3, hereinafter referred to, for the sake of brevity as the "Leonard motor," whose exciting field means 35 receives its voltage from the main power line 100 via a rectifier system, for instance dry-plate rectifier 34 and a resistance 33; the latter can be short-circuited by way of a contact switch 11f being the armature of a relay 11 to be explained further below.

The Ward-Leonard drive further comprises an armature circuit 101 comprising the armature 102 of Leonard generator 2, the armature 103 of the Leonard motor 3, and lines 104 and 105 connecting the collector brushes of both armatures with each other. In one of these connecting lines, for instance in line 105 in Figure 1, there are provided two circuit make and break switches 11d and 11e, which are also armatures of the aforesaid relay 11, and, furthermore, a heat responsive circuit breaker 39.

Figure 2:
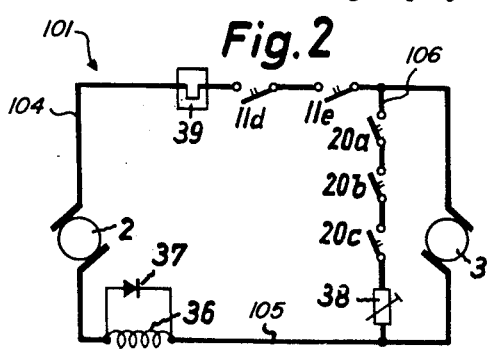
Figure 2 shows a somewhat different arrangement of the Ward-Leonard generator motor circuit in the control arrangement according to the invention.

A preferred embodiment of this Ward-Leonard drive circuit 101 is illustrated in Figure 2. In this circuit, generator 2 is provided with compound field means 36 which can be bridged by means of an electric valve such as dry plate rectifier 37, if the current in armature circuit 101 is inverted. This circuit is also provided with a short circuit braking line 106 shunting the armature 103 of the Leonard motor 3, which line 106 comprises contactor armatures 20a, 20b and 20c, which make and break shunting contact through line 106 dependent upon the energization or deenergization of a braking relay 20, and a braking resistance 38.

The working speeds of the Leonard motor 3 are selected, at will, by a corresponding adjustment of the exciting field of the Leonard generator 2.

Figure 3:
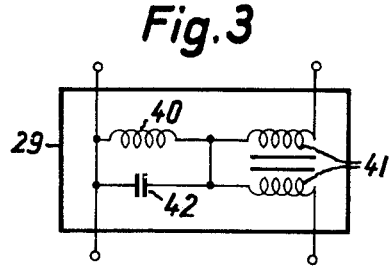
Figure 3 illustrates, by way of example, a magnetic voltage stabilizer of known type which is suitable for use in the control arrangement according to the invention.

The electrical means 32 for producing this exciting field are fed with power from a, preferably magnetic, voltage stabilizer 29, of known construction, which is illustrated, by way of example only, in Figure 3. This magnetic voltage stabilizer comprises, for instance, an air core coil 40, a capacitance 42 and a transformer 41. This voltage stabilizer functions in a manner known per se, and is described, for instance, in "SSW-Zeitschrift" February 1954 No. 2, page 54.

Across the output side of the voltage stabilizer 29, there is connected an auto-transformer 30, which permits to maintain low the stray losses and heat development in the resistances 21 through 28 which are connected to the terminal 107 of the output side of voltage stabilizer 29.

The alternating voltage derived from terminals 107 and 108 of the output side of voltage stabilizer 29 is applied, on the one hand via a contact make and break switch 11c, being equally an armature of the above mentioned relay 11, and on the other hand via the speed control arrangement comprising resistances 21 through 28 and switches 12 through 19 explained further below, to the A.C. terminals of a rectifier system, preferably a known dry-plate rectifier 31, while the direct current terminals of this rectifier 31 are connected to the exciting field means 32, for instance a coil, of Leonard generator 2.

Rectifying systems such as dry-plate rectifiers 31 and 34 are described, for instance, in "Trockengleichrichter" by Karl Maier, 1938, page 29.

The speed control arrangement for the Leonard generator exciting field (means 32), which serves for selecting a desired working speed of motor 3, comprises selective rheostats 22 through 28 which are connected, on the one hand to terminal 107 via a common resistor 21, and switch means 13 through 19, each of which is connected to one of the aforesaid rheostats 22 through 28, respectively.

These switches are operated from a cam-bearing member, or the like, for instance a Jacquard chain or similar pattern control 43 (in Figure 4) via a cam rod 44a acting on a ratchet 44 which, upon rotation by rod 44a, rotates cam shaft 45, on which there are mounted rotatably therewith a number of cam discs 45a to 45f, each of which acts on a switch lever 13b to 19b of switches 13 to 19 respectively, thereby closing or opening contact arms 13a to 19a (Figure 1).

Depending on the speed selected by the aforesaid arrangement, motor 3 drives, via a transmission 46, and pulley 46a, the gear 48, which engages gear 49 on eccentric shaft 50 of the cotton machine.

Figure 5:
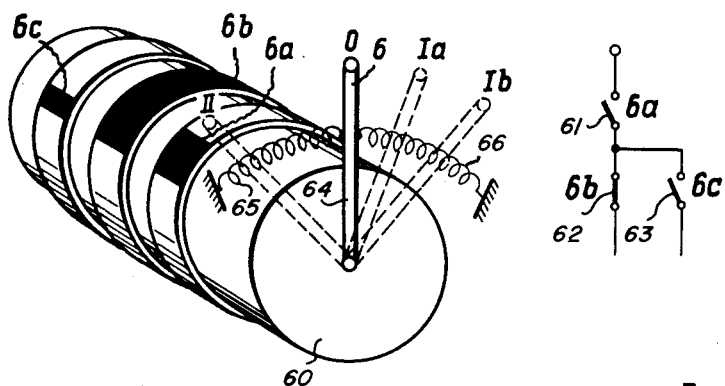
Figure 5 shows in perspective a start-stop switch of the kind suitable for the control arrangement shown in Figure 1.

In order to turn on motor 3, the start-stop switch 6 must be actuated, for instance, manually or automatically. This switch is illustrated in Figure 5 and comprises, for instance, a contact drum 60 rotatable about its central axis by means of a switch lever 64, and adapted to assume an out (zero) position and three different make-contact positions, which are designated by positions Ia, Ib and II in Figure 5. In zero position, only contactor element 62 makes contact with contact terminal 6b, but contactor elements 61 and 63 are open. By turning lever 64 to the right in Figure 5, to assume position Ia, contactor element 61 makes contact with terminal 6a while contact between 62 and 6b is maintained; upon further shifting of lever 64 to assume position Ib contact is also made between element 63 and 6c, while contacts between 61 and 6a, and between 62 and 6b are maintained. When lever 64 is shifted in opposite direction from zero position to position II, contact between element 62 and terminal 6b is interrupted and the Leonard motor 3 is brought to a standstill. Return springs 65 and 66 are provided which urge lever 64 back into zero position.

The control arrangement according to the invention functions in the following manner:

When switch 4 is shifted to make contact power from the A.C. power line 100 becomes available via a transformer 5.

Switch 6 is then shifted manually from zero position to position Ib, whereby contact is made via terminal 6a, 6b being already closed, and via the latter as well as closed circuit break switches 7 through 10, current is caused to flow through the electromagnetic relay 11, whose coil is energized, thereby closing its armatures 11a, 11c, 11d, 11e and 11f, and opening its armature 11b. Relay 11 remains excited on account of armature 11a and contact at 6b being closed, even though switch 6 is returned to zero position by spring 65 and contact at 6a is again interrupted.

A voltage potential is gradually built up due to the closing of relay armature 11c, and the exciting field means 32 become energized. Closing of relay armatures 11d and 11e establishes the circuit between the generator armature 102 and the motor armature 103 of the Leonard drive. Closing of the relay armature 11f short-circuits the resistance 33 in the feeding circuit of the shunt exciting field 35 of motor 3.

As long as relay 11 is energized, the Leonard drive operates the knitting machine at the smallest speed, the so-called creep speed. In order to increase the machine speed, lever 64 of switch 6 is now shifted to position Ib. Thereby contact is made also at 6c and auxiliary relay 12 becomes energized, closing its armature 12a and thereby maintaining itself energized, even after spring 65 has returned switch 6 to zero position.

The auxiliary relay 12 acts as a shifting relay for selective switches 13 through 19, by closing armature 12c, and, at the same time switches off resistance 22, and therewith the creep speed circuit, by opening armature 12b.

The working speed of the machine is then determined by which switch 13 through 19 makes contact.

Even with relay 12 energized and maintained in that state via 11a and 12a (with switch 6 again in zero position), the motor 3 may still be operated at creep speed by the cam disc of switch 13 actuating cam rod 13b thereby opening contact arm 13a and closing contact arm 13c. The creep speed circuit is then closed from terminal 107 via resistance 21, rheostat 22, closed contact arm 13c, rectifier 31, and closed switch 11c back to terminal 108 of the output side of voltage stabilizer 29.

If a higher speed of the knitting machine is desired, a corresponding cam piece on chain 43 will actuate rod 44a, ratchet 44, a corresponding cam disc on shaft 45, and ultimately the desired switch rod, for instance, of switch 18. If this happens, switch 13 will have returned to its original position with contact arm 13c open and arm 13a closed, and, now, contact arm 18c will close and contact arm 18a open. The exciting A.C. voltage to rectifier 31 will then be applied through a circuit constituted by part of resistance 21, rheostat 26, switch contact arm 18a, closed contact arms 17a, 16a, 15a, 14a and 13a of switches 17, 16, 15, 14 and 13 respectively, and contact armature 12c of relay 12, and from rectifier 31 back to voltage stabilizer 29 via closed armature 11c of relay 11.

If a narrowing speed is desired, switches 15 or 16 will be closed in a similar manner by their arms 15c or 16c making contact, and their arms 15a, or 16a, opening. It must be noted, that, if this occurs, it is immaterial whether switch 18 has already responded and opened arm 18c and closed 18a, or not. Irrespective of whether this has happened or not, the A.C. voltage applied to rectifier 31 will now be determined by a circuit via part of resistance 21, rheostat 24, switch arm 15c (or 16c, as the case may be) and arms 14a, 13a, and armature 12c, and from rectifier 31 back to the voltage stabilizer via armature 11c.

It is thus a characteristic and advantageous feature of the control arrangement according to the invention, that upon selection of a lower speed by the selective switch arrangement, all higher speeds are automatically made ineffective, in the manner just explained, irrespective of the rapidity of response of the higher-speed switch.

Moreover, once a certain speed has been selected, it is not possible to cause the machine to operate at a higher speed, for instance by an inadvertent manual actuation of a higher-speed switch, before the selection of the lower-speed switch has not been reversed; e.g. it is impossible to apply a higher voltage through closing switch arm 19c, unless switch arm 16a (or 15a) in the above described example, has first been closed.

As has been described hereinbefore, the armature 102 of Leonard generator 2 is connected to the armature 103 of Leonard motor 3 via contact armatures 11d and 11e of relay 11. When relay 11 is energized, armatures 11d, 11e, and also armature 11f are closed. Thereby resistance 33 in the A.C. voltage line to rectifier 34 is short-circuited, and the shunt energization field 35 of motor 3 receives the full voltage from power line 100.

Resistance 33 is provided for limiting an undue heating of shunt field 35, while motor 3 stands still.

For instance, the Leonard drive circuit 101 can be switched off and the motor 3 brought to a standstill by shifting the lever 64 of switch 6 to position II (Figure 5). Thereby, relay 11 is de-energized and contact armature 11b closes, whereby relay 20 is energized and closes armatures 20a, 20b and 20c in the shunt line 106 of the Leonard circuit 101, so that motor 3 is short circuited via resistance 38. Furthermore, armatures 11d and 11e open and interrupt the Leonard circuit 101.

Resistance 38 acts as an armature short-circuit brake for motor 3 whose armature 103 is thus brought quickly to a standstill, so that the cotton machine is also rapidly stopped.

According to a further embodiment of the Leonard circuit 101 which is illustrated in Figure 2, the Leonard generator 2 is further provided with an auxiliary compound field comprising a field coil 36 and, in parallel thereto, a rectifier 37.

This compound field supports the influence of the shunt exciting field 32. It offers the advantage of a stronger starting momentum even at low speeds of motor 3.

At such low speeds, the Leonard generator is only weakly saturated, i.e. only a small voltage is applied to field 32. In this case, the additional ampere-windings of the compound field 36 yield a proportionally higher increase of the Leonard voltage than is the case, if the shunt field 32 is strongly saturated and the armature voltage of generator 3 is high.

When switching on the Leonard drive with the low Leonard voltage desired for creep speed, the compound field 36 effects a strong increase of the voltage at armature 103, and the resulting strong starting momentum of motor 3 helps to set the knitting machine rapidly into motion.

When switching from higher to lower speeds in the switch arrangement, for instance from full operational speed with contact arm 19 closed to narrowing speed, with switch 15 actuated so that arm 15a is open and arm 15c closed, the armature voltage of generator 2 is so rapidly decreased that the counter E.M.F. of motor 3 becomes greater than the Leonard voltage applied at its brushes. The direction of current flow in Leonard circuit 101 is thereby inverted, and the energy of the rotating masses of Leonard motor armature 103 and of the cotton machine is thereby fed back from motor 3 as from a generator via generator 2 and three-phase motor 1 into the three phase power line 100. On the one hand, this leads to the desired quick braking of motor 3 and of the cotton machine. On the other hand, however, this inversion of current flow also inverts the function of the compound field coil 36, so that the latter no longer strengthens, but weakens the exciting field 32.

If field 32 is weakly excited from rectifier 31, and a strong braking current flows in circuit 101, it may happen that the ampere-windings of the compound field coil 36 become stronger than the field 32 ampere-windings. The common field of the Leonard generator 2 becomes then of opposite direction, and so does the armature voltage and the sense of rotation of motor 3.

In order to avoid this inversion of the sense of rotation of motor 3, a dry-plate rectifier 37 is connected in parallel with coil 36, so that the braking current flows through this rectifier whenever the direction of current flow in circuit 101 is inverted. The compound field coil 36 is then practically short-circuited and will not cause the above described excitation of an oppositely directed field.

The voltage stabilizer provided in the control arrangement according to the invention offers important advantages. By its position in the control circuit of rectifier 31 feeding the shunt exciting field 32, fluctuations of voltage in the power line are prevented from influencing this exciting field. These voltage fluctuations also extend their influence over the rectifier 34 and the shunt exciting field 35 of motor 3. However, since motor 3 is strongly saturated, the effect of these fluctuations is only small.

It is a well known fact, that a higher voltage somewhat reduces the motor speed while a lower voltage somewhat increases the same. The effect of voltage fluctuations on the shunt exciting field 32 of the Leonard generator 2 is, however, the opposite with regard to changes in the speed of motor 3, and is, therefore, compensated partially by the effect of these same fluctuations on the shunt field 35.

It is, therefore, an advantage to lay out the voltage stabilizer 29 in such a manner that the voltage fluctuations in line 100 are not completely compensated, but only to such an extent that the uncompensated voltage fluctuations have just the necessary effect of compensating, through influencing field 35 of motor 3, the changes which they bring about in the speed of motor 3 by influencing generator shunt field 32.

If, for example, the voltage fluctuations in power line 100 amount to 10%, the motor shunt field 35 may suffer changes in the order of 2%. The voltage stabilizer 29 is then laid out to compensate the voltage fluctuations up to 8%, the effect of the remaining 2% influencing field 32 being compensated by their influence on field 35.

If the voltage fluctuations in the power line 100 are 10%, the changes in the speed of motor 3 may be from 1 to 5% approximately depending on the layout of the motor. The voltage stabilizer should be laid out to compensate the difference between these percentages.

Thereby, the operational speeds of the knitting machine can be controlled independent of fluctuations in the voltage of the power supply line.

The control arrangement according to the invention is particularly useful when employed with straight bar knitting machines in smaller knitting plants, because it permits to dispense with special electric attendance, the arrangement containing no electronic tubes or tube amplifying systems.

Transformer 5 is arranged in order to cut off the control voltage for the contactor equipment supplied by the network.

Switches 7 through 10 are arranged in order to switch off the drive if disturbances at the cotton machine are occurring.

It will be understood that this invention is susceptible to modification in order to adapt it to different usages and conditions, and, accordingly, it is desired to comprehend such modifications within this invention as may fall within the scope of the appended claim.

What I claim is:

A control arrangement for use in straight-bar knitting machines which is powered from an A.C. voltage source, comprising, in combination, a Ward Leonard circuit comprising a motor and a generator, said motor being connected to the knitting machine for driving the same first means connected to the A.C. voltage source for producing a shunt exciting field for said motor, second means connected to the A.C. voltage source for producing a shunt exciting field for said generator, said second field-producing means comprising a rectifier system for rectifying the A.C. voltage supplied by said A.C. voltage source and delivering D.C. voltage to said shunt exciting field of said generator, said field producing means thus being divided into A.C. and D.C. branches, means incorporated in said A.C. branch of said second field producing means for controlling selectively said shunt exciting field produced by said second field-producing means so as to control the speed of said motor and consequently that of the knitting machine, and a voltage stabilizer connected to said A.C. voltage source and adapted for feeding voltage to said shunt exciting field produced by said second field-producing means via said rectifier system, said voltage stabilizer being so laid out as to compensate voltage fluctuations originating in said A.C. voltage source up to a fraction corresponding to the changes effected by said voltage fluctuations in the shunt exciting field produced by said first field-producing means and consequently in the speed of said motor, whereby an exciter may be dispensed with.

References Cited in the file of this patent

UNITED STATES PATENTS

| | | |
|---|---|---|
| 2,253,321 | Blankenbuehler | Aug. 19, 1941 |
| 2,281,518 | Elberty | Apr. 28, 1942 |
| 2,320,841 | Abell | June 1, 1943 |
| 2,456,950 | King | Dec. 12, 1948 |
| 2,628,336 | Jones | Feb. 10, 1953 |
| 2,665,402 | Clark | Jan. 5, 1954 |
| 2,677,085 | Sikorra | Apr. 27, 1954 |